(12) United States Patent
Nakajima

(10) Patent No.: US 6,915,915 B2
(45) Date of Patent: Jul. 12, 2005

(54) SHELF UNIT

(75) Inventor: Yoshimasa Nakajima, Kanagawa (JP)

(73) Assignee: Nagashimaya Co., Ltd., Kanagawa (JP)

( * ) Notice: Subject to any disclaimer, the term of this patent is extended or adjusted under 35 U.S.C. 154(b) by 28 days.

(21) Appl. No.: 10/284,122

(22) Filed: Oct. 31, 2002

(65) Prior Publication Data

US 2003/0085191 A1 May 8, 2003

(30) Foreign Application Priority Data

Nov. 7, 2001 (JP) .......................................... 2001-341465

(51) Int. Cl.[7] .............................................. A47B 43/00
(52) U.S. Cl. ...................................................... 211/186
(58) Field of Search ................................ 211/186, 182, 211/183

(56) References Cited

U.S. PATENT DOCUMENTS

| | | | | |
|---|---|---|---|---|
| 1,952,111 A | * | 3/1934 | Bales | .......................... 108/107 |
| 3,092,217 A | * | 6/1963 | Alloggio | ....................... 403/173 |
| 3,749,343 A | * | 7/1973 | Marschak | ..................... 248/188 |
| 3,883,104 A | * | 5/1975 | Delafield | ..................... 248/188 |
| 3,896,743 A | * | 7/1975 | Pariente | ....................... 108/190 |
| 4,488,698 A | * | 12/1984 | Delafield | ..................... 248/188 |
| 4,556,148 A | * | 12/1985 | Koller | ......................... 211/189 |
| 5,269,419 A | * | 12/1993 | Aldeguer et al. | ............ 211/188 |

* cited by examiner

Primary Examiner—Hugh B. Thompson, II
Assistant Examiner—Sarah Purol
(74) Attorney, Agent, or Firm—Greenblum & Bernstein, P.L.C.

(57) ABSTRACT

A shelf unit assembled by joining a vertical member as a stud to a corner of a shelf or a chest, wherein the shelf unit is assembled with a shelf or chest in which the surface of the corner is formed into a corrugated surface of forming corrugation in a right-to-left direction, and a vertical member in which the surface of a portion to be joined with the corner is formed into a corrugated surface that overlaps the corrugated surface of the corner, whereby the shelf unit can be maintained always in a stable state without jolting of the vertical member or slack of the screw to facilitate assembling operation and reduce the cost.

11 Claims, 7 Drawing Sheets

SHELF UNIT

BACKGROUND OF THE INVENTION

1. Field of the Invention

This invention concerns a shelf unit for joining to assemble a vertical member as a stud to a shelf or a chest.

2. Statement of the Related Art

A shelf unit can optionally select and change attaching positions of a shelf or a chest and includes those for assembling a book shelf or a display shelf by joining only the shelf with vertical members or those properly combining to assemble a shelf and a chest in accordance with the space of a room and application use.

The shelf comprises shelf plates for placing various articles which include an ordinary shelf plate, as well as a desk top plate for placing a display or a keyboard of a personal computer and a top plate for use in a table. Further, the chest has a box-like shape for accommodating various articles and includes cabinets of a hinged door type or a drawer type and magazine racks.

Most of existent shelf units have been assembled by joining two front and back vertical members to each of light and left ends of a shelf or a chest respectively. In a case where the joined portion has a structure, for example, as shown in FIG. 9, in which a vertical member 62 as a stud is clamped to an end face 61 of a shelf 60 by a single screw 63, when a heavy weight article is placed on the shelf 60, the vertical member 62 clamped to the end face 61 of the shelf 60 is caused to slid under the weight of the article in a direction rotating around the screw 63 as an axis as shown by the arrows in the drawing. Then, the shelf unit jolts in the forward-to-backward direction and the screw 60 for camping the vertical member 62 is slackened by the jolting to result in an extremely instable state of causing jolting not only in the forward-to-backward direction but also in the left to right direction in the shelf unit.

Therefore, when the vertical member 62 is clamped to the end face 61 of the shelf 60 by the single screw 63, an anti-jolting diagonal beam referred to as a cross bar or a cross brace is attached to the back of the shelf unit for stabilizing the shelf unit.

However, when the cross bar as the diagonal beam is attached to the back of the shelf unit, it entirely lacks in smart appearance which is not attractive. In addition, material cost is increased by so much as the attachment of the cross bar and it also results in a problem of increasing the number of assembling steps to bring bout a trouble in the assembly.

When the number of the screws for camping the vertical number to the end face of the shelf is increased, for example, by one and two screws are used, since the rotating torque around the screw as the axis does not exert, jolting of the shelf unit can be prevented without attaching the cross bar. However, since the number of the screws used is doubled, it results in a problem of taking more time for the assembly of the shelf unit then in a case of attaching the cross bar.

In view of the above, a technical subject of this invention is to prevent jolting of a shelf unit without attaching a cross bar even in a case where the joined portion between a shelf and a vertical member is clamped by a single screw.

SUMMARY OF THE INVENTION

For solving the foregoing subject, this invention provides a shelf unit assembled by using a shelf or a chest in which the surface of the corner is formed into a corrugated surface causing corrugation in a right-to-left direction (that is in the horizontal direction) and a vertical member in which the surface of a portion to be joined with the corner is formed into a corrugated surface that overlaps the corrugated surface of the shelf or chest.

In the shelf unit according to this invention, the surface for the corner of the shelf or the chest and the surface of the vertical member to be joined to the corner are formed, respectively, into the corrugated surfaces forming corrugation in the right-to-left direction and the corrugated surfaces are overlapped with each other.

With the constitution described above, even when the vertical member is clamped to the corner of the shelf only by a single screw for instance, sliding movement of the vertical member in the rotational direction around the screw as the axis is inhibited and slack of the screw for clamping the vertical member is also prevented by inhibition of the sliding movement of the vertical member, so that the shelf unit is kept in a stable state with no jolting even when a cross bar for reinforcement is not attached to the back surface.

DESCRIPTION OF THE ACCOMPANYING DRAWINGS

DESCRIPTION OF PREFERRED EMBODIMENTS OF THE INVENTION

This invention is to be described specifically by way of preferred embodiments with reference to the drawings.

Figure 1:
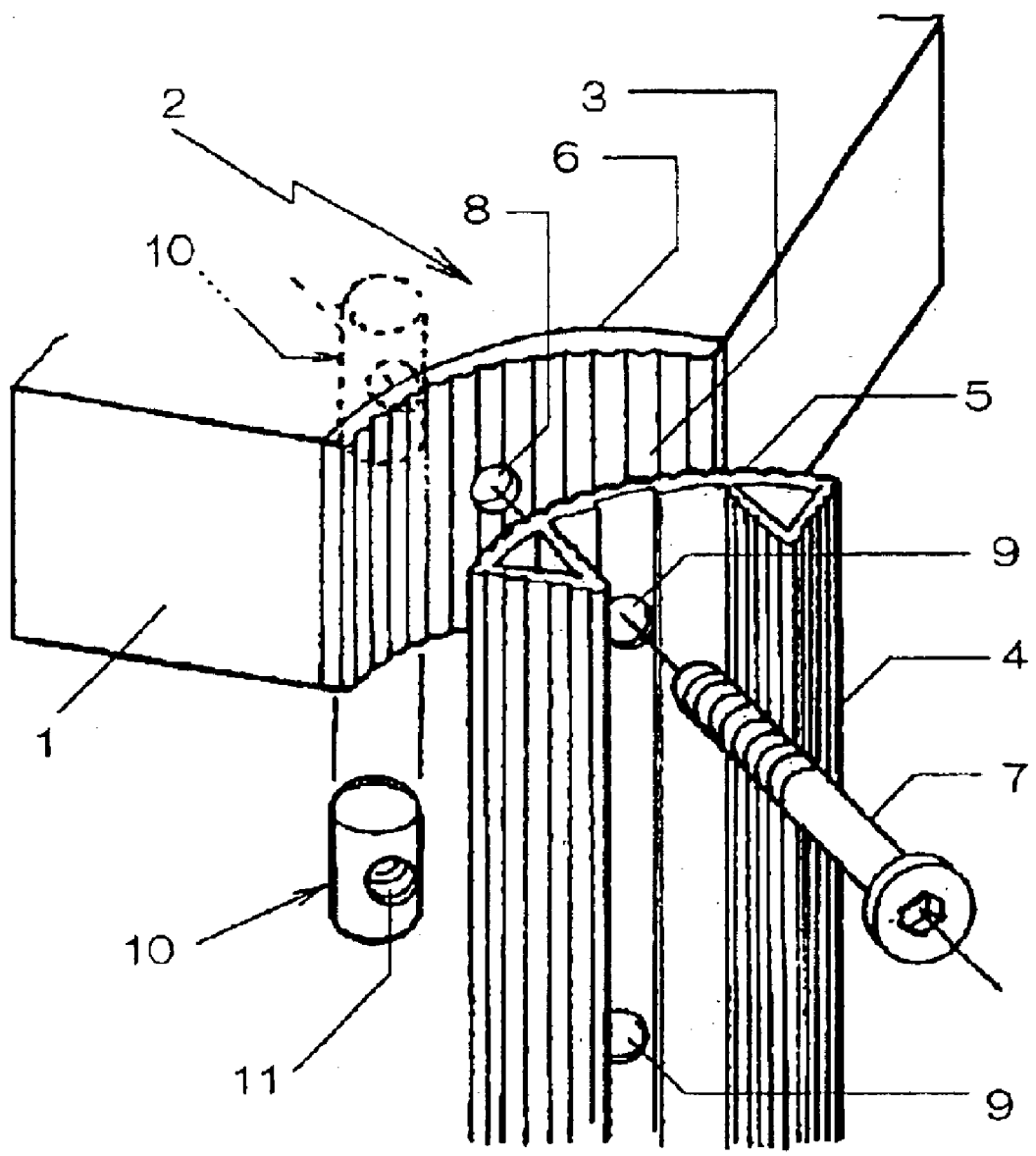
FIG. 1 is a perspective view showing an example of a constitution for a main portion of a shelf unit according to this invention.
Figure 2:
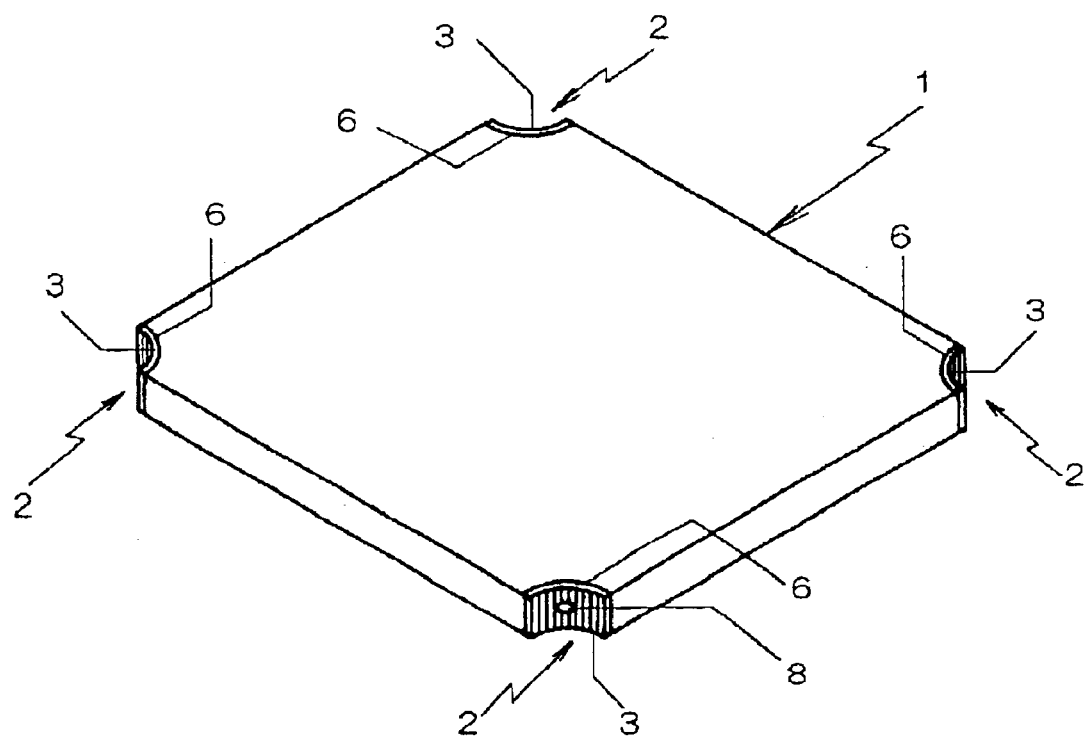
FIG. 2 is a perspective view showing an example of a shelf used for a shelf unit according to this invention.
Figure 3:
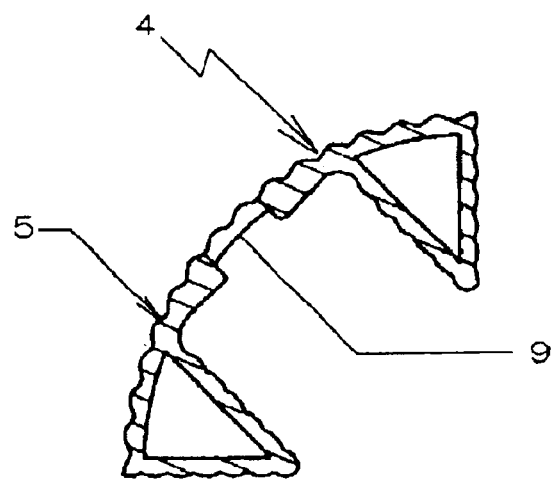
FIG. 3 is a transversal cross sectional view showing an example of a vertical member used for the shelf unit according to this invention.
Figure 4:
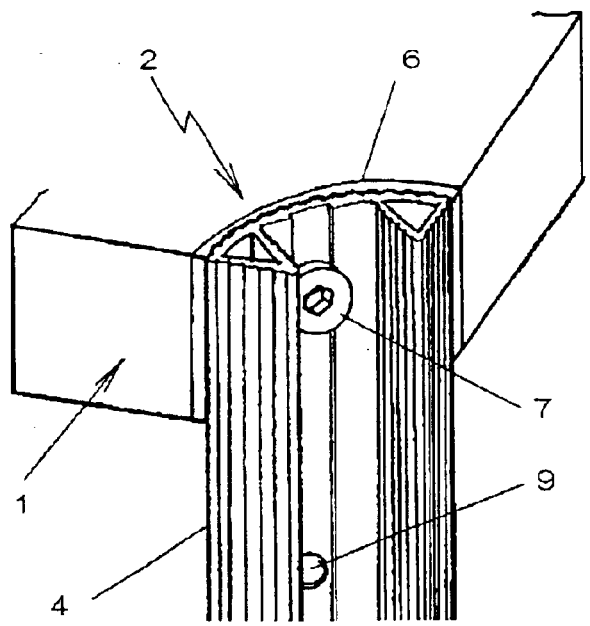
FIG. 4 is a perspective view showing a joined state between the shelf in FIG. 2 and the vertical member in FIG. 3.

FIG. 1 shows a constitution in which a vertical member 4 shown in FIG. 3 is joined with a corner 2 of a shelf shown in FIG. 2. The shelf 1 is a rectangular shelf plate having four corners 2, 2 - - - and each corner 2 has an arcuate concave side 3 with an angle of center of 90° and the surface of the concave side 3 is formed into a corrugated surface forming corrugation in the right-to-left direction (circumferential direction).

The vertical member 4 in FIG. 3 has an arcuate convex side 5 with an angle of center of 90° capable of fitting the concave side 3 of the shelf 1, and the surface of the convex side 5 is formed into a corrugated surface that overlaps with the corrugated surface formed on the surface of the concave side 3 of the shelf 1.

Further, the concave side 3 of the shelf 1 comprises a metal plate 6 such as made of aluminum secured to the corner 2 by means of an adhesive or the like, and a hole 8 is apertured at the central position of the concave side 3 comprising the metal plate 6 for insertion of a threaded bolt 7.

In the vertical member 4, a plurality of bolt holes 9 for passing through the threaded bolts 7 are apertured to the convex side 5 at a predetermined pitch along the longitudinal direction of the vertical member 4.

The vertical member 4 is entirely formed of an extruded shaped aluminum member. A nut 10 having a threaded hole 11 cut with female threads for thread coupling with the threaded bolt 9 is buried to the corner 2 of the shelf 1 in a state where the threaded hole 11 is in communication with the hole 8 in the metal plate 6.

Then, when the shelf unit is assembled, a threaded bolt 7 is passed through the bolt hole 9 of the vertical member 4 disposed to a position at which the shelf 1 is intended to be attached, the top end of the threaded bolt 7 is inserted into the hole 8 apertured in the concave side 3 of the shelf 1 and the top end is threadingly coupled with the threaded hole 11 of the nut 10 buried in the corner 2 of the shelf 1.

Then, in a state of urging the convex side 5 of the vertical member 4 to the concave side 3 of the shelf 1 to fit the concave side 3 and the convex side 5 with each other and, at the same time, the corrugated surfaces formed on the surfaces for the concave side 3 and the convex side 5 are overlapped with each other. In this state, the threaded bolt 7 is tightly screwed into the threaded hole 11 to clamp the vertical member 4 to the corner 2 of the shelf 1.

This can reliably prevent the vertical member 4 from sliding in the direction rotating around the threaded bolt 7 as an axis. Further, since the threaded bolt 7 threadingly coupled with the threaded hole 11 of the nut 10 can be prevented from slackening by the inhibition of the sliding movement, the shelf unit is retained in a stable state not causing jolting even without attaching the cross bar.

Figure 5:
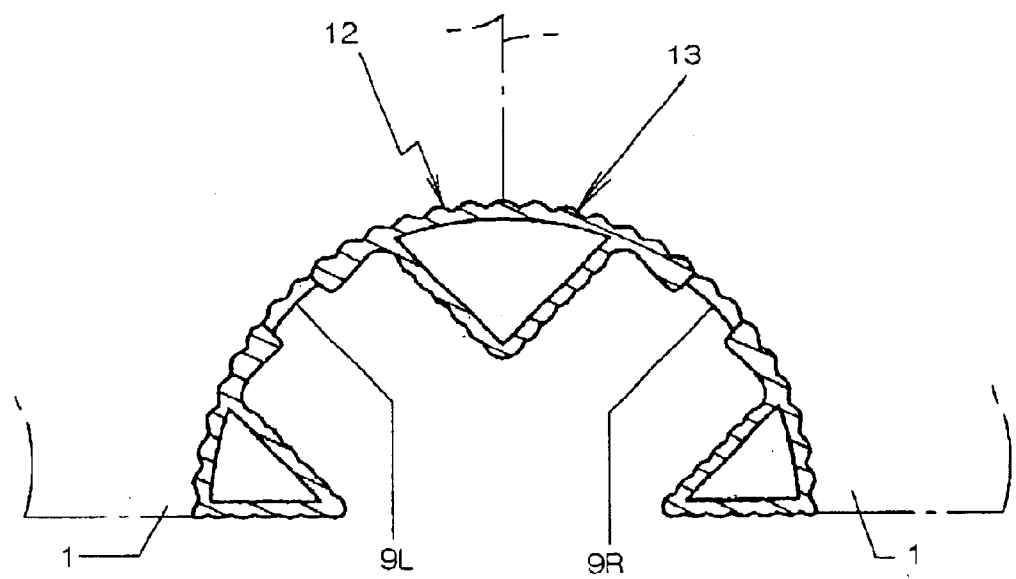
FIG. 5 is a transversal cross sectional view showing a modified example of a vertical member used for the shelf unit according to this invention.

Further, in a case of extending the shelf 1 in the right-to-left direction, a vertical member shown in FIG. 5 capable of joining two right and left shelves 1 by one member is used. The vertical member 12 is molded into a shape of integrating the vertical member 4 in FIG. 3 by the number of two, to form an arcuate convex side 13 with an angle of center of 180°, such that the arcuate concave side 3 with an angle of center of 90° formed to each shelf 1 can be fitted being arranged by the number of two in the right-to-left direction. A pair of right and left bolt holes 9R and 9R are apertured at a predetermined pitch along the longitudinal (vertical) direction of the vertical member 12 for passing through the threaded bolt 7, to the convex side 13.

Figure 6:
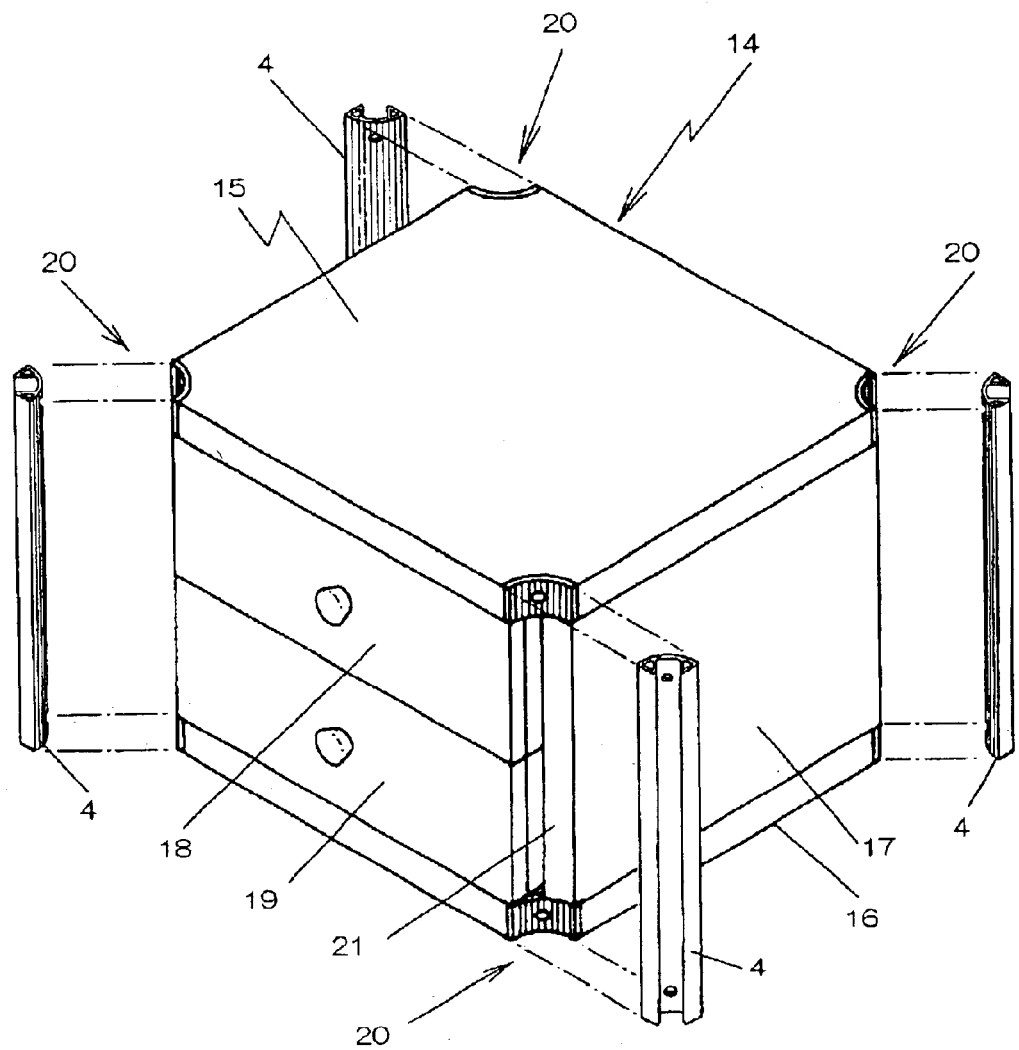
FIG. 6 is a perspective view showing an example of a chest used for the self unit according to this invention.

The shelf unit according to this invention is not restricted to those assembled with the shelf 1 and the vertical member 4 or assembled with the shelf 1 and the vertical members 4 and 12, but also include those assembled with the chest 14 and the vertical members 4, 12, as shown in FIG. 6.

A chest 14 illustrated in FIG. 6 is a drawer-type cabinet in which drawers 18 and 19 in upper and lower two stages are disposed in a box body comprising a top plate 15, a bottom plate 16, right and left side plates 17 and a back plate. The corner 20 thereof is formed as an arcuate concave side 21 with an angle of center of 90° capable of fitting the convex side 5 of the vertical member 4 or the convex side 13 of the vertical member 12.

Then, in the chest 14, a corrugated surface that overlaps with the corrugated surface formed to the convex side 5 of the vertical member 4 or the convex side 13 of the vertical member 12 is formed only to the corner of the top plate 15 and the bottom plate 16 forming a portion of the concave side 21 formed at the corner 20 of the chest 14, and the vertical members 4, 12 is clamped by threaded bolts 7 only to the corner of the top plate 15 and the bottom plate 16 formed with the corrugated surface.

With the constitution described above, the vertical members 4, 12 can be joined firmly to the chest 14 by means of two threaded bolts 7, and even when the vertical member 12 is joined with the chest 14, the drawers 18 and 19 of the chest 14 can be drawn out.

Since the top plate 15 and the bottom plate 16 have the identical structure with those of the shelf 1 in FIG. 2, explanation for the detailed structure is to be omitted.

Further, while the shelf 1 in FIG. 2 is a rectangular shelf plate, the shelf in this invention may be a trigonal shelf plate or top plate for use in disk or a top plate for use in a table. Further, while the illustrated chest 14 is a drawer-type cabinet, the chest according to this invention may be a hinged door-type cabinet, or a magazine rack.

Further, the concave side 3, 21, formed at the corner of the shelf of the chest and the convex side 5, 13 formed to the vertical member is not restricted only to the arcuate shape but may be polygonally flexed angled shape.

Figure 7:
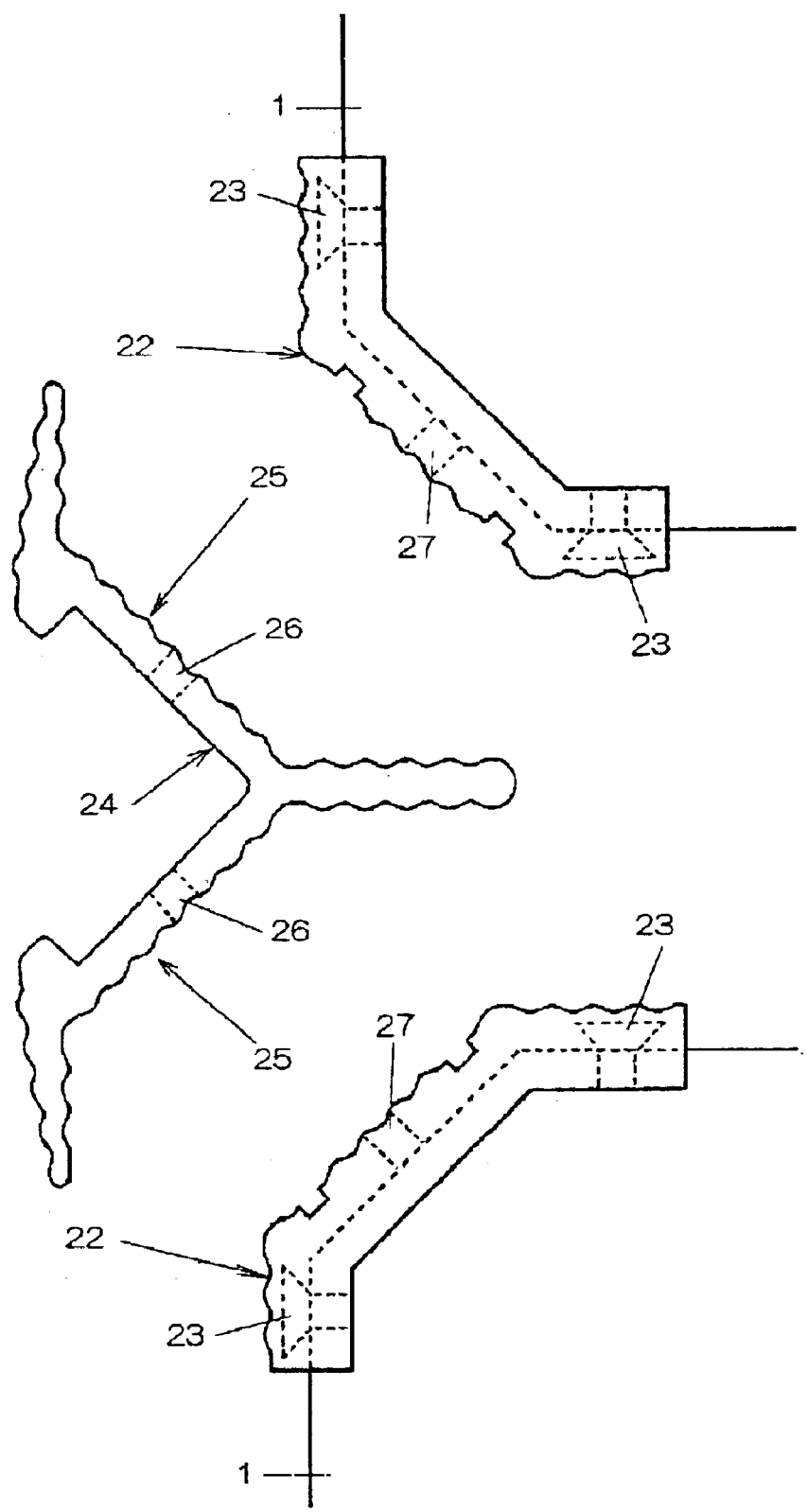
FIG. 7 is a plan view showing another example of the shelf unit according to this invention.

Then, in a shelf unit shown in FIG. 7, a corner 2 of a shelf 1 is fabricated into a corner-cut shape with the corner portion being cut off at 45°, and an angled metal plate 22 in which the surface is formed into a corrugated surface forming corrugation in the right-to-left direction is secured by bolts 23, 23. On the other hand, in a vertical member 24, a portion to be joined with the corner 2 of the corner-cut shape is formed into an angled concave side 25 bent so as to fit the corner 2 to each other, and the surface of the concave side 24 is formed into a corrugated surface that overlaps with the corrugated surface formed to the surface of the corner 2 by the metal plate 22 secured to the corner 2 of the shelf 1.

Further, in the vertical member 24, the concave side 25 to be joined with the corner 2 of the shelf 1 is formed as a pair of right and left portions, and a plurality of bolts for passing through the threaded bolts respectively are disposed at a predetermined pitch in the longitudinal direction of the vertical member 24. On the other hand, in the metal plate 22 secured to the corner 2 of the shelf 1, bolt holes 27 in communication with the bolt holes 26 disposed to the concave side 25 of the vertical member 24 fitted with the corner 2 are disposed at positions corresponding to the bolt holes 26, so that the vertical member 24 is clamped to the corner by the threaded bolts screwed into the corner 2 passing through the bolt holes 26 and 27.

Figure 8:
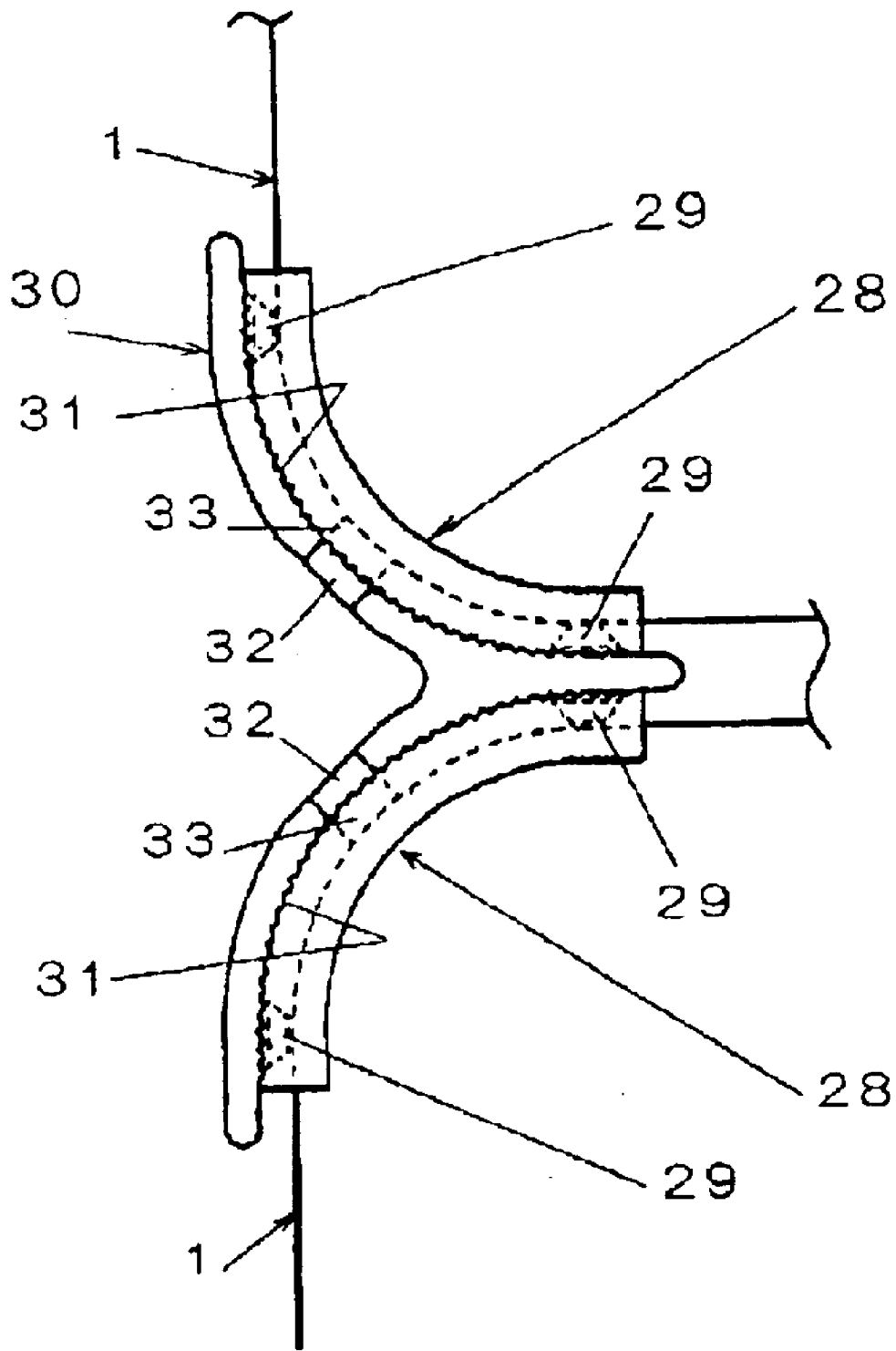
FIG. 8 is a plan view showing a further example of the shelf unit according to this invention.
Figure 9:
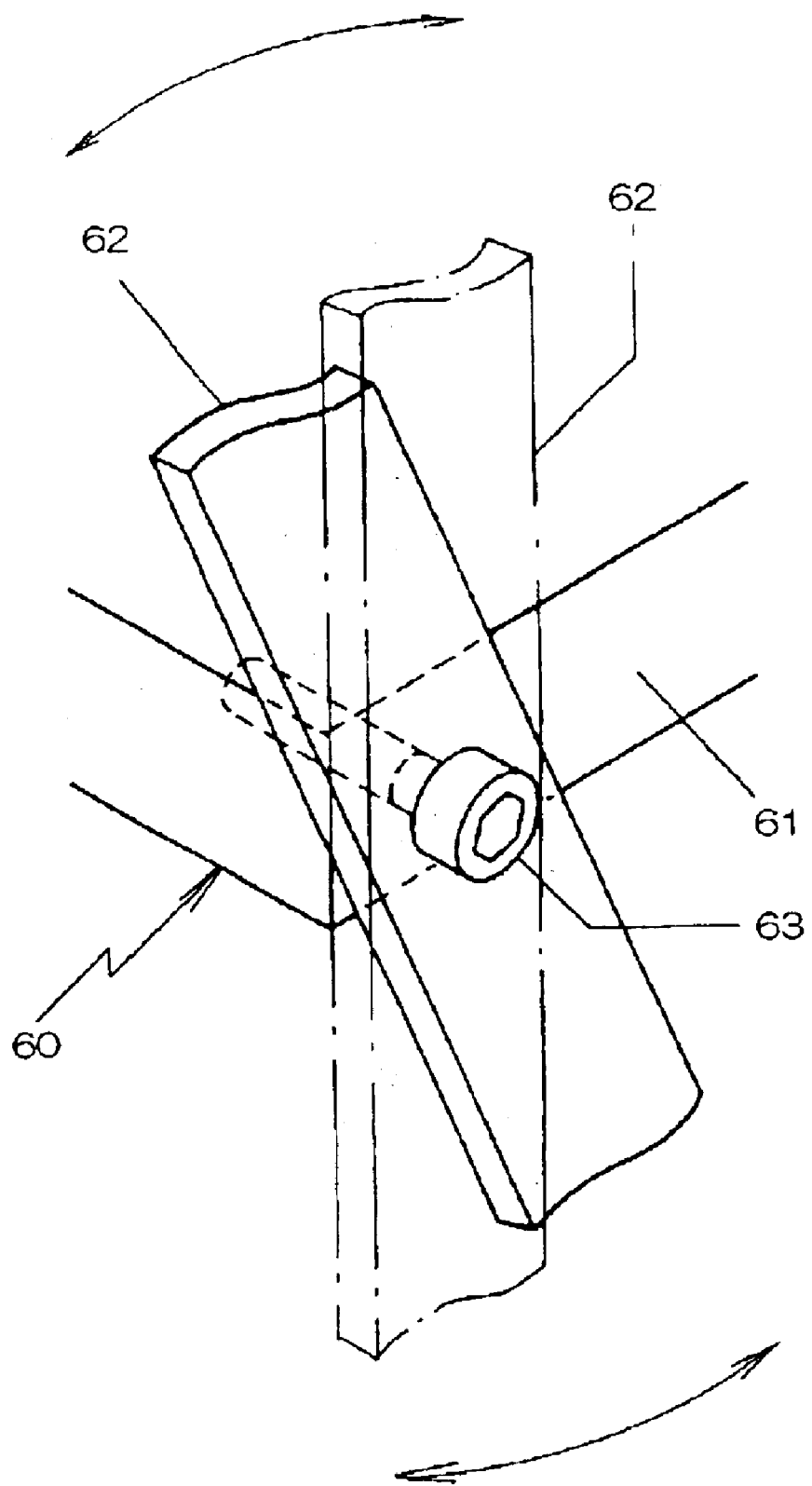
FIG. 9 is a perspective fragmentary view showing an existent shelf unit.

Then, a shelf unit shown in FIG. 8 is fabricated such that a corner 2 of a shelf 1 is formed into a rounded corner shape of cutting-off the corner part into an arcuate shape, and an arcuate metal plate 28 in which the surface is formed into a corrugated surface forming corrugation in the right-to-left direction is secured by bolts 29, 29. On the other hand, a portion of a vertical member 30 to be joined with the corner 2 of the rounded corner shape is formed into an arcuate concave side 31 capable of fitting the corner 2 to each other, and the surface of the concave side 31 is formed into a corrugated surface that overlaps with the corrugated surface of the corner 2 by a metal plate 28 secured to the corner 2 of the shelf 1.

Further, in the vertical member 30, a pair of right and left concave sides 31 are formed for joining with the corner 2 of the shelves 1 such that one vertical member can join the two right and left shelf 1 by a single member. In each of the concave sides 31, a plurality of bolt holes 32 for passing through the threaded bolts respectively are disposed each at a predetermined pitch along the longitudinal direction of the vertical member 30. On the other hand, in the metal plate 28 secured to the corner 2 of the shelf 1, bolt holes 33 in communication with the bolt holes 32 disposed to the concave side 31 of the vertical member 30 to be fitted with the corner 2 are disposed at positions corresponding to the bolt holes 32, and the vertical member 30 is clamped to the corner 2 by threaded bolts which are screwed passing through the bolt holes 32 and 33 into the corner 2.

In the vertical member 24 in FIG. 7 or the vertical member 30 in FIG. 8, the concave side 25 or 31 capable of fitting the corner 2 of the shelf 1 is formed each by a right and left pair. However, this is not restrictive but the concave side 25 or the concave side 31 may be formed only each by one.

According to this invention, when the shelf and the vertical member are combined by a single screw, the vertical member does not slide in the direction rotating around the screw as the axis to cause jolting of the shelf unit or the screw is not slackened to retain the shelf unit always in a stable state.

Accordingly, for preventing jolting of the shelf unit, since there is no requirement for attaching a cross bar as a diagonal beam at the back, or for joining the shelf and the vertical member by means of a plurality of screws, this can provide excellent effects that the number of assembling steps for the shelf unit can be reduced to simplify assembling and, at the same time, the cost for the shelf unit can be decreased.

The present disclosure relates to subject matter contained in priority Japanese Patent Application No.2001-341,465 filed on Nov. 7, 2001, the contents of which is herein expressly incorporated by reference in its entirety.

What is claimed is:

1. A shelf unit comprising a vertical member and a corner of one of a shelf and a chest that is joined to the vertical member, a first curved surface of the corner comprising rounded corrugations disposed continuously in a predetermined direction, a second curved surface of the vertical member comprising rounded corrugations that overlap the first curved surface of the corner, the rounded corrugation providing binding power in a direction transverse to the direction in which force is applied when the vertical member and the corner are joined.

2. A shelf unit as defined in claim 1, the first curved surface forming a corrugated concave side of the corner, the second curved surface forming a corrugated convex side of the vertical member that overlaps the first curved surface of the corner.

3. A shelf unit as defined in claim 2, wherein the concave side of the corner is an arcuate concave side with a central angle of approximately 90° and the convex side of the vertical member is an arcuate convex side with a central angle of one of approximately 90° and approximately 180°.

4. A shelf unit as defined in claim 2, wherein a plurality of bolt holes, each at a predetermined pitch along a longitudinal direction of the vertical member, are disposed to the convex side of the vertical member for receiving threaded bolts.

5. A shelf unit as defined in claim 4, wherein at least one threaded hole for receiving at least one threaded bolt is disposed to the concave side of the shelf.

6. A shelf unit as defined in claim 4, wherein a plurality of threaded holes for receiving a plurality of threaded bolts are disposed at corners of a top plate and a bottom plate of a chest.

7. A shelf unit as defined in claim 6, wherein the first curved surface is formed only at corners of the top plate and the bottom plate of the chest.

8. A shelf unit as defined in claim 1, wherein the surface of the corner of one of the shelf and the chest comprises a metal plate.

9. A shelf unit as defined in claim 1, wherein the second curved surface forms a corrugated concave side of the vertical member that overlaps the first curved surface of the corner.

10. A shelf unit as defined in claim 1, wherein the shelf is one of a shelf plate, a top plate used for a table and a top plate used for a desk.

11. A shelf unit as defined in claim 1, wherein the shelf is one of a hinged drawer type cabinet and a magazine rack.

* * * * *